(12) United States Patent
Kimura et al.

(10) Patent No.: US 7,972,523 B2
(45) Date of Patent: Jul. 5, 2011

(54) METHOD OF MANUFACTURING MAGNETIC RECORDING MEDIUM

(75) Inventors: Kaori Kimura, Kawasaki (JP); Yousuke Isowaki, Yokohama (JP); Yoshiyuki Kamata, Tokyo (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 45 days.

(21) Appl. No.: 12/509,261

(22) Filed: Jul. 24, 2009

(65) Prior Publication Data

US 2010/0018947 A1 Jan. 28, 2010

(30) Foreign Application Priority Data

Jul. 25, 2008 (JP) .................. 2008-192536

(51) Int. Cl.
*B44C 1/22* (2006.01)
(52) U.S. Cl. ................ 216/22; 216/44; 216/66; 216/77; 216/81
(58) Field of Classification Search .................. 216/22, 216/44, 66, 77, 81
See application file for complete search history.

(56) References Cited

U.S. PATENT DOCUMENTS

| 2004/0253817 | A1* | 12/2004 | Imada et al. ................. 438/688 |
| 2005/0284842 | A1 | 12/2005 | Okawa et al. |
| 2006/0124585 | A1 | 6/2006 | Suwa et al. |
| 2007/0281078 | A1 | 12/2007 | Kikitsu et al. |
| 2008/0078739 | A1 | 4/2008 | Hibi et al. |
| 2008/0093336 | A1* | 4/2008 | Lee et al. ......................... 216/22 |
| 2008/0158718 | A1* | 7/2008 | Kobayashi et al. ........ 360/77.08 |
| 2008/0217615 | A1 | 9/2008 | Kerber |
| 2010/0053813 | A1* | 3/2010 | Fukushima et al. .......... 360/131 |

FOREIGN PATENT DOCUMENTS

| JP | 2006-012332 | 1/2006 |
| JP | 2006-196143 | 7/2006 |
| JP | 3844755 B2 | 8/2006 |
| JP | 2009-076924 | 4/2009 |

OTHER PUBLICATIONS

Notice of Reasons for Rejection mailed by JPO on Oct. 13, 2009 in the corresponding Japanese patent application No. 2008-192536.
Notice of Reasons for Rejection mailed by JPO on Feb. 2, 2010 in the corresponding Japanese patent application No. 2008-192536.
Explanation of Non-English Language References.

* cited by examiner

*Primary Examiner* — Binh X Tran
(74) *Attorney, Agent, or Firm* — Knobbe, Martens, Olson & Bear, LLP (57) ABSTRACT

According to one embodiment, a method of manufacturing a magnetic recording medium includes forming a magnetic recording layer, an oxidation inhibiting layer, a hard mask layer includes carbon on a substrate, coating the hard mask layer with a resist, transferring patterns of protrusions and recesses to the resist by imprinting to form resist patterns, sequentially performing etching of the hard mask layer using the resist patterns as masks, etching of the oxidation inhibiting layer, and etching and/or magnetism deactivation of the magnetic recording layer to form patterns of the magnetic recording layer, and sequentially performing stripping of the resist patterns, stripping of the hard mask layer and stripping of the oxidation inhibiting layer, in which ion beam etching is used for stripping the oxidation inhibiting layer.

19 Claims, 5 Drawing Sheets

METHOD OF MANUFACTURING MAGNETIC RECORDING MEDIUM

CROSS-REFERENCE TO RELATED APPLICATIONS

This application is based upon and claims the benefit of priority from Japanese Patent Application No. 2008-192536, filed Jul. 25, 2008, the entire contents of which are incorporated herein by reference.

BACKGROUND

1. Field

One embodiment of the present invention relates to a method of manufacturing a magnetic recording medium.

2. Description of the Related Art

In the information-oriented society in recent years, the amount of data that needs to be stored in a recording medium has been continually increasing. To keep up with the increase in amount of data, there has been a demand for a recording apparatus and a recording medium with a dramatically high recording density. As regards a hard disk for which there is an increasing demand as a high-capacity and inexpensive magnetic recording medium, it is predicted that a recording density of one terabits per square inch or more, which is about ten times higher than the current recording density, will be required several years after.

In an existing magnetic recording medium used in a hard disk, one bit is recorded in a specific region of a thin film made of polycrystals of fine magnetic grains. To improve the recording capacity of the magnetic recording medium, therefore, the recording density must be increased. For this purpose, it is effective to reduce a recording mark size usable in recording per bit. If, however, the recording mark size is simply reduced, effect of recording noise caused by the shape of fine magnetic grains cannot be neglected. Instead, if the fine magnetic grains are reduced in size, it is impossible to maintain the data recorded in fine magnetic grains at an ordinary temperature due to a problem of thermal fluctuation.

To avoid these problems, it is proposed to use a bit patterned medium in which dots of recording material are separated by a non-recording material in advance so as to perform read and write using a single recording dot as a single recording cell.

Also, the problem that interference between adjacent tracks makes it difficult to increase the track density becomes marked in a magnetic recording medium installed in an HDD. In particular, reducing write blurring of a write head magnetic field is a serious technical problem. To solve the problem, a discrete track patterned medium (DTR medium) is proposed in which recording tracks are separated by processing a magnetic recording layer. The DTR medium can increase the track density because it can reduce the side erase phenomenon that information on an adjacent track is erased in writing, and the side read phenomenon that information on an adjacent track is read out in reading. Accordingly, the DTR medium is expected as a magnetic recording medium capable of achieving a high recording density. It should be noted that when using the term "patterned medium" in a broad sense the term includes the bit patterned medium and DTR medium.

In manufacturing the patterned medium including the DTR medium, reducing the track pitch directly increases the tack density and recording density eventually. The track pitch finally depends on the width of the sidewall, i.e., tapered portion, of a magnetic pattern; the smaller the width of the sidewall, the smaller the track pitch. That is, the track density can be improved if it is possible to form magnetic patterns of a highly rectangular shape. Also, since the error rate is lowered as the magnetic spacing between the head and the magnetic recording layer is made smaller, the magnetic spacing is important.

In a conventional method of manufacturing a patterned medium, a resist is applied to a magnetic recording layer, patterns of protrusions and recesses are transferred from a stamper onto a resist by imprinting, and then the magnetic recording layer is etched using the resist patterns as masks to form magnetic patterns. Since difference between an etching rate of the resist and that of the magnetic recording layer made of metal is small, however, the thickness of the resist is made larger the required processing depth.

To solve the problem, a method is used in which a hard mask made of carbon (C) having a lower etching rate than that of the magnetic recording layer is used, patterns of protrusions and recesses of the resist are transferred to the hard mask, and the magnetic recording layer is etched using the hard mask patterns as masks. Use of the hard mask enables manufacturing of a patterned medium having magnetic patterns with a good rectangular shape.

In order to improve the recording density of the medium installed in a hard disk drive, it is necessary to reduce the effective magnetic spacing between the head and the medium. In order to reduce the magnetic spacing, it is necessary to strip off the hard mask completely. In view of reducing the process time for stripping off the hard mask, it is suitable to employ reactive ion etching (RIE), which can enhance the etching rate of carbon. Since oxygen is likely to react with the magnetic recording layer, however, the magnetic recording layer is oxidized in the step of stripping the hard mask, and there is a risk of deterioration the error rate.

Japanese Patent No. 3844755 describes a method comprising: forming a first mask layer made of TiN and a second mask layer made of Ni on a magnetic recording layer, applying a resist thereto, imprinting a stamper to the resist, and sequentially etching those layers to form magnetic patterns. In this method, however, it has been found that the sidewall of the magnetic pattern formed has a large width. Therefore, the method causes a problem that the resultant medium has poor resistance against recording to the neighboring track under a desired track density.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the present invention will be described hereinafter with reference to the accompanying drawing.

Various embodiments according to the invention will be described hereinafter with reference to the accompanying drawings. In general, according to one embodiment of the invention, there is provided a method of manufacturing a patterned medium comprising: forming a magnetic recording layer, an oxidation inhibiting layer, a hard mask layer comprising carbon on a substrate; coating the hard mask layer with a resist; transferring patterns of protrusions and recesses to the resist by imprinting to form resist patterns; and sequentially performing etching of the hard mask layer using the resist patterns as masks, etching of the oxidation inhibiting layer, and etching and/or magnetism deactivation of the magnetic recording layer to form patterns of the magnetic recording layer, and sequentially performing stripping of the resist patterns, stripping of the hard mask layer and stripping of the oxidation inhibiting layer, wherein ion beam etching is used for stripping the oxidation inhibiting layer.

Figure 1:
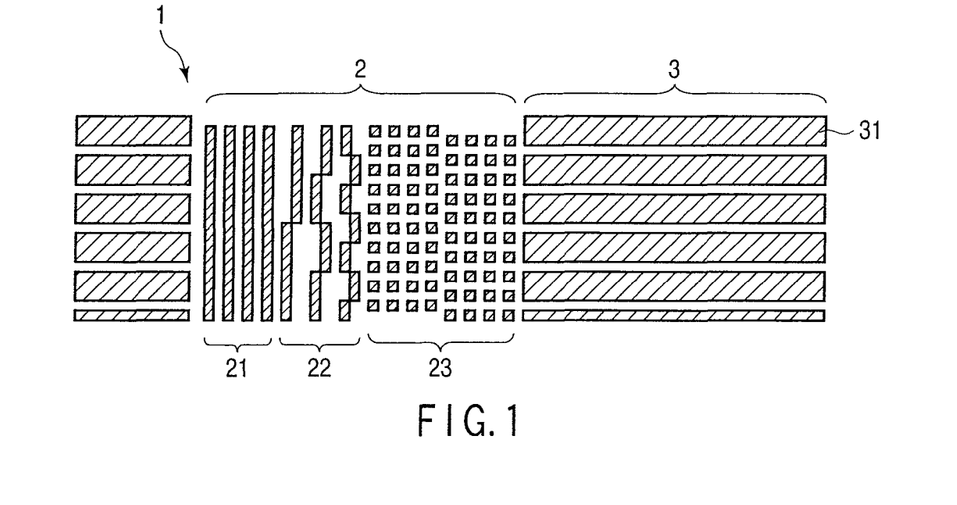
FIG. 1 is a plan view along the circumferential direction of a DTR medium according to an embodiment of the present invention.

FIG. 1 is a plan view along the circumferential direction of a DTR medium as an example of a patterned medium to be manufactured using a method of the present invention. As shown in FIG. 1, servo areas 2 and data areas 3 are alternately formed along the circumferential direction of the patterned medium 1. The servo area 2 includes a preamble section 21, address section 22, and burst section 23. The data area 3 includes discrete tracks 31.

Figure 2:
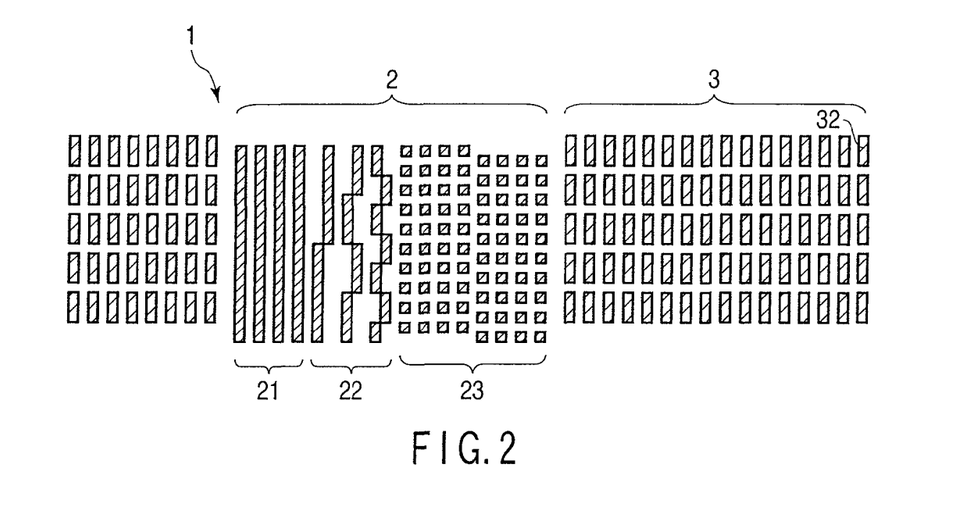
FIG. 2 is a plan view along the circumferential direction of a bit patterned medium according to another embodiment of the present invention.

FIG. 2 is a plan view along the circumferential direction of a bit patterned medium as another example of the patterned medium to be manufactured using the method of the present invention. This patterned medium has magnetic dots 32 in the data area 3.

A method of manufacturing a patterned medium according to an embodiment of the present invention will be described below with reference to FIGS. 3A to 3J.

Figure 3A:
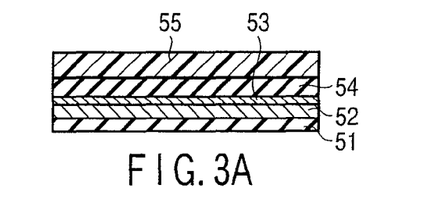
FIGS. 3A to 3J are cross-sectional views showing a method of manufacturing a magnetic recording medium according to an embodiment of the present invention.

A 40-nm thick CoZrNb soft magnetic underlayer, 20-nm thick Ru orientation control underlayer, 15-nm thick CoCrPt-$SiO_2$ magnetic recording layer 52, 3-nm thick Ru oxidation inhibiting layer 53, and 15-nm thick carbon (C) hard mask layer 54 are sequentially deposited on a glass substrate 51. For the sake of simplicity, the soft magnetic underlayer and orientation control layer are not depicted in the drawings. The hard mask layer 54 is coated with a 100-nm thick spin-on-glass (SOG) as a resist 55 (FIG. 3A).

Figure 3B:
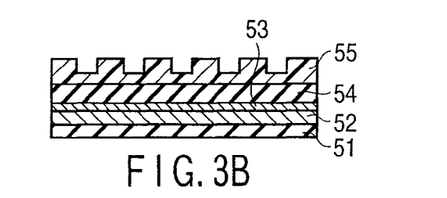

A stamper (not shown) having patterns of protrusions and recesses corresponding to FIG. 1 or 2, for example, is faced to the resist 55, and the patterns of protrusions and recesses of the stamper are transferred to the resist 55 by imprinting (FIG. 3B).

Figure 3C:
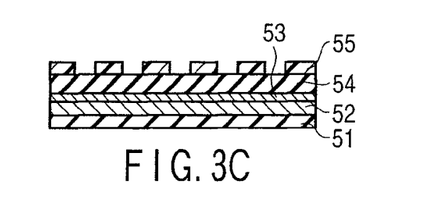

The resist residues remaining on the bottoms of recesses of the resist (SOG) 55 are removed by which a part of the surface of the hard mask layer 54 is exposed. The conditions in the process are, for example, as follows: an inductively coupled plasma (ICP) etching apparatus is used, $CF_4$ is used as the process gas, the gas pressure is set to 0.1 Pa, the coil RF power and the platen RF power are set to 200 W and 20 W, respectively, and the etching time is set to 30 seconds (FIG. 3C).

Figure 3D:
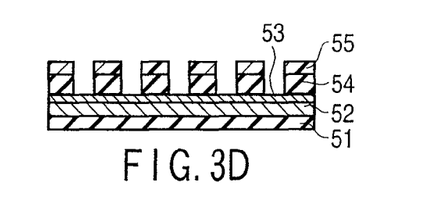

The remaining resist patterns are used as masks to etch the exposed hard mask layer by which the oxidation inhibiting layer 53 is exposed. The conditions in the process are, for example, as follows: a reactive ion etching (RIE) apparatus is used, $O_2$ is used as the process gas, the gas pressure is set to 0.1 Pa, the coil RF power and the platen RF power are set to 100 W and 50 W, respectively, and the etching time is set to 30 seconds (FIG. 3D).

Figure 3E:
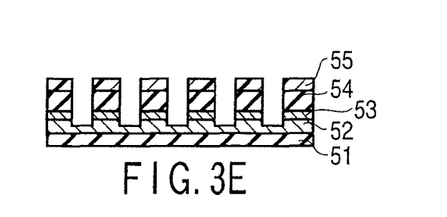

The resist (SOG) patterns and the patterns of the hard mask layer 54 are used as masks to etch the oxidation inhibiting layer 53 and the magnetic recording layer 52 to a total thickness of 10 nm by which a part of the magnetic recording layer 52 is remained in the recesses. The conditions in the process are, for example, as follows: an electron cyclotron resonance (ECR) ion gun is used, Ar is used as the process gas, the microwave power is set to 500 W, the acceleration voltage is set to 600 V and the etching time is set to 20 seconds (FIG. 3E).

Figure 3F:
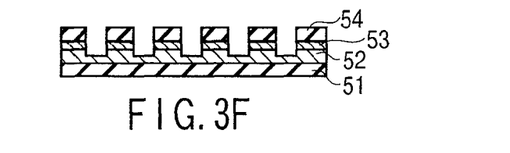

The remaining resist (SOG) 55 is stripped off. The conditions in the process are, for example, as follows: an ICP etching apparatus is used, $CF_4$ is used as the process gas, the gas pressure is set to 1.5 Pa, the coil RF power and the platen RF power are set to 200 W and 0 W, respectively, and the etching time is set to 120 seconds (FIG. 3F).

Figure 3G:
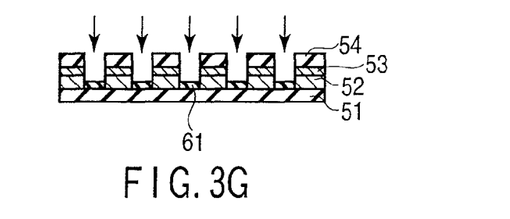

The magnetic recording layer 52 remaining in the recesses is magnetically deactivated by which a nonmagnetic layer 61 is formed. The conditions in the process are, for example, as follows: an ECR ion gun is used, He is used as the process gas, the gas pressure is set to 0.01 Pa, the microwave power is set to 1000 W, the acceleration voltage is set to 400 V, and the exposure time is set to 200 seconds (FIG. 3G).

Figure 3H:
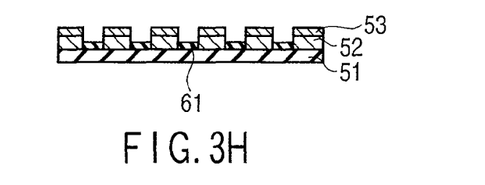

The remaining patterns of the hard mask layer 54 are stripped off by which the oxidation inhibiting layer 53 on the protrusions is exposed. The conditions in the process are, for example, as follows: an ICP etching apparatus is used, $O_2$ is used as the process gas, the gas pressure is set to 1.5 Pa, the coil RF power and the platen RF power are set to 400 W and 0 W, respectively, and the etching time is set to 20 seconds (FIG. 3H).

Figure 3I:
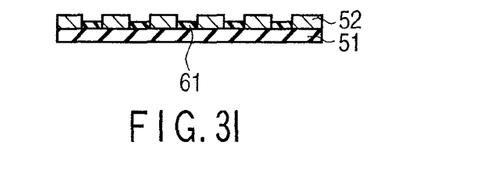

The remaining patterns of the oxidation inhibiting layer (Ru) 53 are stripped off by which the protruded magnetic recording layer 52 is exposed. The conditions in the process are, for example, as follows: an ECR ion gun is used, Ar is used as the process gas, the microwave power is set to 500 W, the acceleration voltage is set to 600 V, and the etching time is set to 10 seconds (FIG. 3I).

Figure 3J:
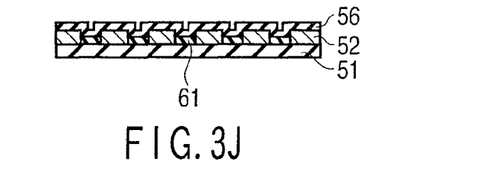

Further, a carbon protective film 56 is formed on the entire surface by chemical vapor deposition (CVD) (FIG. 3J). A lubricant (not shown) is applied to the carbon protective film 56 by which the patterned medium according to the embodiment is manufactured.

Figure 4A:
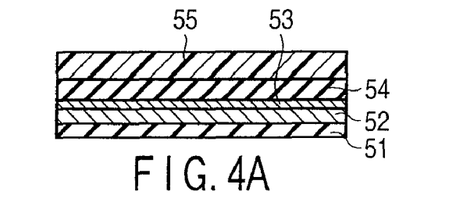
FIGS. 4A to 4I are cross-sectional views showing a method of manufacturing of magnetic recording medium according to another embodiment of the present invention.
Figure 4B:
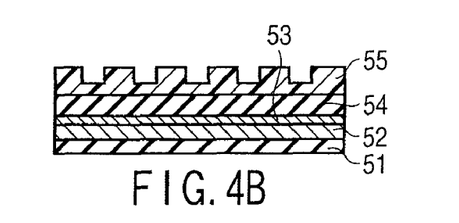
Figure 4C:
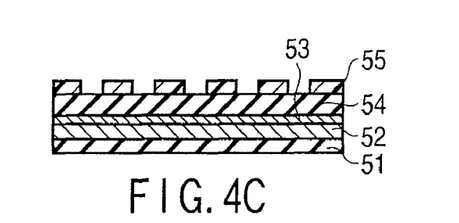
Figure 4D:
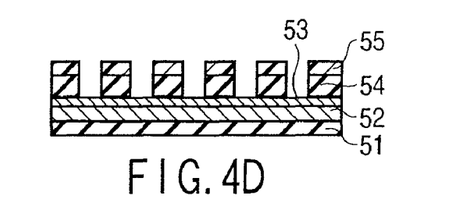
Figure 4E:
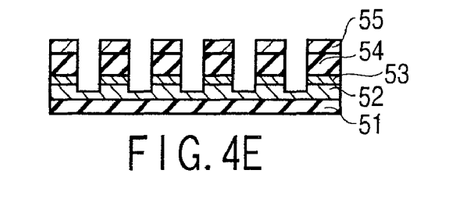
Figure 4F:
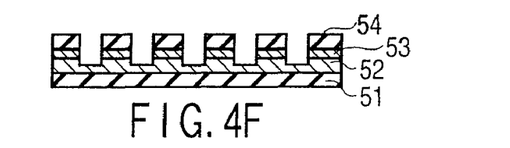
Figure 4G:
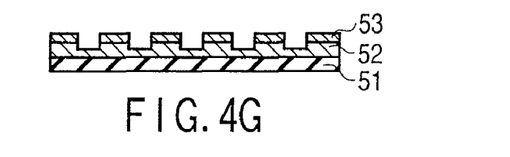
Figure 4H:
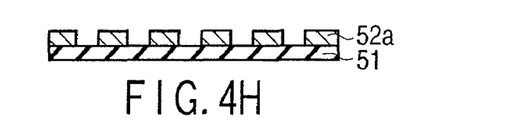
Figure 4I:
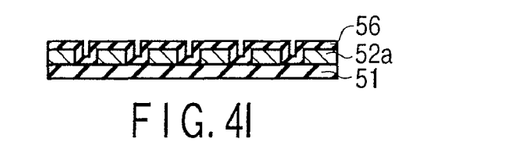

A method of manufacturing a patterned medium according to another embodiment of the present invention will be described below with reference to FIGS. 4A to 4I. The steps shown in FIGS. 4A to 4F are the same as those shown in FIGS. 3A to 3F. Thereafter, the remaining patterns of the hard mask layer 54 are stripped off by which the magnetic recording layer 52 is exposed without performing the step of magnetically deactivating the magnetic recording layer in the recesses (FIG. 4G). The magnetic recording layer 52 remaining in the recesses is etched over the whole thickness using the patterns of the oxidation inhibiting layer 53 as masks by which magnetic patterns 52a are formed. At the same time the magnetic recording layer 52 is etched, the oxidation inhibiting layer 53 remaining on the protrusions is stripped off (FIG. 4H). Further, a carbon protective film 56 is formed on the entire surface by CVD (FIG. 4I).

Figure 5A:
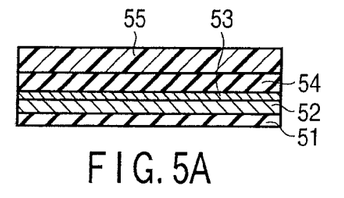
FIGS. 5A to 5L are cross-sectional views showing a method of manufacturing a magnetic recording medium according to still another embodiment of the present invention.
Figure 5B:
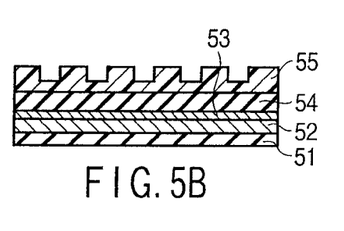
Figure 5C:
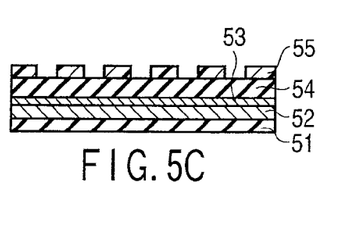
Figure 5D:
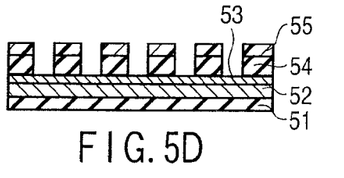
Figure 5E:
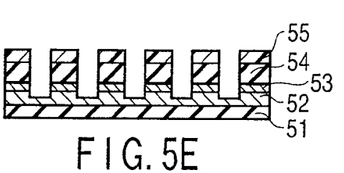
Figure 5F:
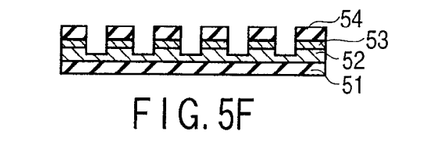
Figure 5G:
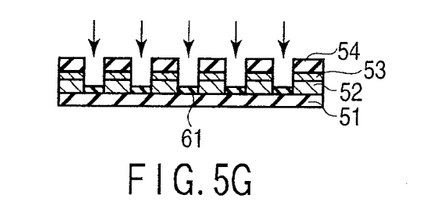
Figure 5H:
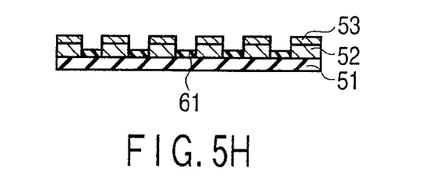
Figure 5I:
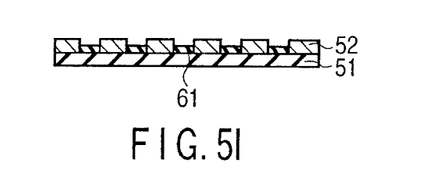
Figure 5J:
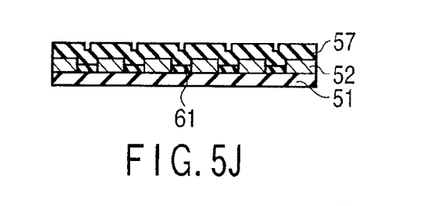
Figure 5K:
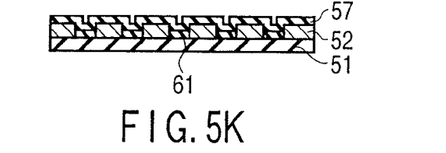
Figure 5L:
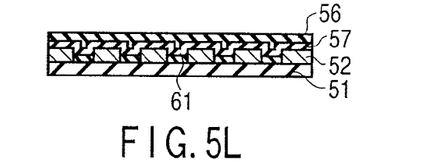

A method of manufacturing a patterned medium according to still another embodiment of the present invention will be described below with reference to FIGS. 5A to 5L. The steps shown in FIGS. 5A to 5I are the same as those shown in FIGS. 3A to 3I. Thereafter, a nonmagnetic layer 57 is formed on the entire surface (FIG. 5J). The nonmagnetic layer 57 is etched back and filled in recesses between magnetic patterns 52a (FIG. 5K). The steps shown in FIGS. 5H and 5I may be repeated a plurality of times. Further, a carbon protective film 56 is formed on the entire surface by CVD (FIG. 5L).

Next, the steps and materials in the embodiments of the present invention will be described below.

[Oxidation Inhibiting Layer]

The oxidation inhibiting layer is formed between the magnetic recording layer and the hard mask layer comprising carbon as the main component. The oxidation inhibiting layer is made of a material more resistant to oxidation than the magnetic recording layer. The materials for the oxidation inhibiting layer is selected from a metal such as Sn, Pb, Re, Cu, Ru, Rh, Ag, Pd, Pt and Au, and alloys thereof, and compounds thereof such as oxides, nitrides and sulfides, where the oxidation inhibiting layer may be a stacked layer of the plurality of the materials.

In view of oxidation inhibition, it is not preferable that the oxidation inhibiting layer is too thin. The oxidation inhibiting layer preferably has a thickness of 2 nm or more. On the other hand, since the hard mask layer is stripped off and then the oxidation inhibiting layer is stripped off by using Ar ion milling and the like in view of reducing the magnetic spacing, it is also not preferable that the oxidation inhibiting layer is too thick. When the hard mask layer is stripped off, the magnetic recording layer in the recesses is etched at the same time. Thus, it is not preferable that the oxidation inhibiting layer has protrusions and recessed of 15 nm or more converted to the thickness of the magnetic recording layer in view of glide characteristics. However, the above materials has a high milling rate by Ar and therefore the magnetic recording layer in the recesses is etched not so much when the oxidation inhibiting layer is stripped off by Ar ion milling.

It should be noted that when an uppermost layer of a metal film, such as Pt which is unlikely to be oxidized, is formed on the magnetic recording layer like an ECC medium, the uppermost layer may be used as the oxidation inhibiting layer. In this case, the oxidation inhibiting layer needs not be stripped off.

[Imprinting]

The surface of the medium is coated with a resist by spin coating, and a stamper is pressed against the resist to transfer the patterns of the stamper to the resist. As the resist, it is suitable to use a silicon-based resist such as SOG. As the resist, a general novolak-based photoresist may be used. However, it is not preferable to use a resist having an excessively higher etching rate by oxygen compared to the hard mask layer comprising carbon as the main component.

A patterned surface of the stamper having patterns of protrusions and recesses corresponding to servo data and recording tracks is faced to the resist. In this time, the stamper, the medium substrate, and a buffer layer are stacked on the lower plate of a die set, the upper plate of the die set is placed on the buffer layer to sandwich the structure, and pressed under 2,000 bar for 60 seconds, for example. The height of the patterns of protrusions and recesses formed on the resist by imprinting is, for example, 60 to 70 nm. The resist to be pushed out is moved by keeping this state for about 60 sec. When the stamper is coated with a fluorine-based release material in advance, the stamper can be well released from the resist.

[Residue Removal]

The resist residues remaining on the bottoms of the recesses of the resist patterns are removed by RIE (reactive ion etching). The plasma source is preferably an ICP (inductively coupled plasma) apparatus that can generate high-density plasma at a low pressure. However, it is also possible to use an ECR (electron cyclotron resonance) plasma apparatus or a RIE apparatus of a general parallel plate type. When SOG is used as the resist, RIE is carried out using fluorine-containing gas such as $CF_4$ and $SF_6$. When photoresist is used as the resist, RIE is carried out using $O_2$ gas or $O_2/CF_4$ mixed gas.

[Hard Mask Layer]

The hard mask layer comprising carbon as the main component can be formed by sputtering or CVD. The thickness of the hard mask layer is preferably 4 to 40 nm. The hard mask layer having a large thickness takes a long etching time when it is stripped off, which is a cause of damaging the sidewalls of the magnetic patterns. The hard mask layer having a small thickness cannot function as the hard mask in etching the magnetic recording layer. The hard mask preferably has such a composition that the carbon content is 75% or more in the ratio by the number of atoms. The carbon content less than 75% decreases etching selectivity, making it impossible to process the magnetic recording layer in a good shape.

[Etching of Magnetic Recording Layer]

The magnetic recording layer is etched using the patterns of the hard mask layer as masks. The magnetic recording layer is preferably etched using the ion beam of a rare gas such as He, Ne, Ar, Kr, or Xe, or etched using an ion beam of Ar gas, or $O_2$ gas or $N_2$ gas, generated by ECR (electron cyclotron resonance) ion gun. The magnetic recording layer may be etched by RIE using Cl gas, a mixed gas of CO and $NH_3$, or methanol.

In etching the magnetic recording layer, the magnetic recording layer may be partly left behind by making the processing depth of the magnetic recording layer smaller than its thickness. In this case, separating regions are formed by deactivating the magnetism of the magnetic recording layer remaining in the recesses. If a medium manufactured by etching the magnetic recording layer so as to be partly left in the recesses is installed in a drive, head flying characteristics are improved.

In etching the magnetic recording layer, the layer may be etched over the entire thickness. In this case, the step of deactivating the magnetism of the magnetic recording layer is not necessary.

[Magnetism Deactivation]

When the processing depth of the magnetic recording layer is made smaller than its thickness, the magnetism of the magnetic recording layer remaining in the recesses is deactivated in order to improve the fringe characteristics. The term "deactivation" herein means that the magnetism is completely eliminated or deteriorated. The magnetism deactivating step can be performed using a gas or solution. As the gas, it is possible to use a reactive gas such as $CF_4$, $SF_6$, $CHF_3$, $O_2$, or $N_2$, or a mixed gas thereof. If a fluorine-based gas is used, a step of removing reaction products formed by reaction of fluorine with Co contained in the magnetic recording layer may be performed. The reaction products are preferably removed by washing with water, or irradiation with a water vapor plasma or $H_2$ plasma. If $O_2$ or $N_2$ is used, no such removing step is necessary because O atoms or N atoms penetrate the crystal. If $O_2$ gas is used, the carbon hard mask layer is simultaneously etched, so the carbon hard mask layer is favorably formed thick.

In order to deactivate the magnetism of the magnetic recording layer, a rare gas such as He, Ne, Ar, Kr, or Xe may be used. In this case, no reaction product is formed because the magnetism deactivation is caused by destruction of the crystal structure. If the rare gas is used, it is also possible to etch the magnetic recording layer and to deactivate the magnetism at the same time.

In order to deactivate the magnetism of the magnetic recording layer, wet etching may be performed using an acid such as hydrofluoric acid, hydrochloric acid, nitric acid, or sulfamic acid.

[Stripping of Resist]

Before or after the magnetic recording layer is etched, the resist is stripped off. When the resist is stripped off before the magnetic recording layer is etched, the thickness of the resist is not be reduced by etching of the magnetic recording layer, and therefore this process needs a long period of time compared the process where the resist is stripped off after the magnetic recording layer is etched. When the resist is stripped off after the magnetic recording layer is etched, the resist may be stripped off at the same time the magnetism deactivation, or the resist may be stripped off before or after the magnetism deactivation. The resist made of SOG is preferably stripped off using a fluorine-containing gas. The photoresist is preferably stripped off using oxygen or oxygen-containing mixed gas. The stripping of the resist is preferably carried out with ICP etching apparatus and RIE apparatus. The photoresist may be stripped off using solvent such as isopropyl alcohol (IPA).

[Stripping of Hard Mask]

After the magnetic recording layer is etched, or after the magnetism deactivation or the resist stripping, if necessary, the hard mask is stripped off. The stripping of the hard mask can easily be performed with oxygen ashing apparatus, ICP etching apparatus and RIE apparatus. An excessively long stripping time relative to the thickness of the hard mask layer is not preferable because the process causes damages due to oxidation to the magnetic recording layer, leading to deteriorated SN ratio. Although the magnetic recording layer is unlikely to be damaged by oxidation owing to the presence of the oxidation inhibiting layer, the oxidation inhibiting layer may be etched by oxygen depending on etching conditions. Therefore, the shorter stripping time of the hard mask is preferable.

[Stripping of Oxidation Inhibiting Layer]

After the hard mask is stripped off, it is preferable to strip the oxidation inhibiting layer for the purpose of reducing the magnetic spacing. The oxidation inhibiting layer can be stripped off by physical etching using Ar gas. Since the magnetic recording layer in the recesses is also etched at the same time the stripping of the oxidation inhibiting layer, the depth of the recesses in the magnetic recording layer should be made shallow at the time of starting the stripping of the oxidation inhibiting layer. The oxidation inhibiting layer may be stripped off over the entire thickness. Alternately, the stripping of the oxidation inhibiting layer may be stopped if the process gives no effect to the magnetic spacing. In the latter process, the thickness of the oxidation inhibiting layer to be left behind is preferably 4 nm or less in view of magnetic spacing. If a metal layer made of a material such as Pt which is unlikely to be oxidized, which is formed as the uppermost layer of the magnetic recording layer, is used as the oxidation inhibiting layer, the oxidation inhibiting layer needs not be stripped off. However, such an oxidation inhibiting layer may be stripped off for the purpose of removing a part exposed to oxygen plasma. In this case, the metal layer as the uppermost layer of the magnetic recording layer is preferably deposited in a large thickness.

[Recess Filling]

After the oxidation inhibiting layer is stripped off, the recesses may be filled with a nonmagnetic material. The nonmagnetic material is deposited by bias sputtering or normal sputtering for filling the recesses. The nonmagnetic material includes an inorganic material, a metal, or an oxide or nitride thereof such as Si, SiC, SIC—C, SiOC, SiON, $Si_3N_4$, Al, $Al_xO_y$, Ti, $TiO_x$, Ru, Pd, NiNb, NiNbTi, NiTa, NiSi, Zr, $ZrO_x$, W, Ta, Cr, CrN, CN, and a mixture thereof. The bias sputtering is a method in which the sputter-deposition is performed while applying a bias to the substrate, making it possible to deposit the nonmagnetic material while filling the recesses without trouble. Since the bias sputtering likely to cause substrate dissolution and sputtering dust generation due to the substrate bias, however, normal sputtering is more favorable. Although RF sputtering may be used, DC sputtering is more favorable because the RF sputtering likely leads to thickness distribution.

In the case of performing the recess filling, the oxidation inhibiting layer may be stripped off at the same time the planarization of the nonmagnetic material. In other words, the recess filling with nonmagnetic material is performed without striping the oxidation inhibiting layer, and the oxidation inhibiting layer may be stripped off by etch-back.

[Etch-Back for Planarization]

When filling the recesses with the nonmagnetic material is performed, etch back is performed until the magnetic recording layer, or the carbon protective film formed on the magnetic recording layer as needed, is exposed. The etch-back process is desirably preformed by ion milling. If a silicon-based filling material such as $SiO_2$ is used, however, the etch-back process may be performed by RIE using a fluorine-containing gas. The etch-back may be performed using an ECR ion gun. If $O_2$ is mixed in the process gas for etch-back, etch-back is performed together with surface modification.

[Surface Protective Film Formation and Post Processing]

Finally, formation of the carbon protective film is performed. Although the carbon protective film is desirably deposited by CVD in order to improve the coverage to the protrusions and recesses, it may be deposited by sputtering or vacuum evaporation. When the carbon protective film is deposited by CVD, a DLC film containing a large amount of $sp^3$-bonded carbon is formed. The carbon protective film with a thickness less than 2 nm leads to poor coverage. The carbon protective film with a thickness exceeding 10 nm brings about increased magnetic spacing between a read/write head and the medium, leading to deteriorated SNR. Further, the protective film is coated with a lubricant. As the lubricant, it is possible to use, for example, perfluoropolyether, fluorinated alcohol, or fluorinated carboxylic acid.

Next, other suitable materials used in the embodiments of the present invention will be described below.

[Substrate]

As the substrate, for example, a glass substrate, Al-based alloy substrate, ceramic substrate, carbon substrate or Si single crystal substrate having an oxide surface may be used. As the glass substrate, amorphous glass or crystallized glass is used. Examples of the amorphous glass include common soda lime glass and aluminosilicate glass. Examples of the crystallized glass include lithium-based crystallized glass. Examples of the ceramic substrate include common aluminum oxide, aluminum nitride or a sintered body containing silicon nitride as a major component and fiber-reinforced materials of these materials. As the substrate, those having a NiP layer on the above metal substrates or nonmetal substrates formed by plating or sputtering may be used.

Although only sputtering is described herein as a method of forming a thin film on the substrate, vacuum evaporation or electroplating also exhibits the similar effect to that of the sputtering.

[Soft Magnetic Underlayer]

The soft magnetic underlayer (SUL) serves a part of such a function of a magnetic head as to pass a recording magnetic field from a single-pole head for magnetizing a perpendicular magnetic recording layer in a horizontal direction and to circulate the magnetic field to the side of the magnetic head, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAlSiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. In the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise. Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

[Magnetic Recording Layer]

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in-the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are deteriorated, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted. The coercivity of the perpendicular magnetic recording layer is preferably 237000 A/m (3000 Oe) or more. If the coercivity is less than 237000 A/m (3000 Oe), thermal fluctuation resistance tends to be deteriorated. The perpendicular squareness of the perpendicular magnetic recording layer is preferably 0.8 or more. If the perpendicular squareness is less than 0.8, the thermal fluctuation resistance tends to be deteriorated.

[Protective Layer]

The protective layer is provided for the purpose of preventing corrosion of the perpendicular magnetic recording layer and also preventing the surface of a medium from being damaged when the magnetic head is brought into contact with the medium. Examples of the material of the protective layer include those containing carbon, $SiO_2$ or $ZrO_2$. The thickness of the protective layer is preferably 1 to 10 nm. This is preferable for high-density recording because the spacing between the head and the medium can be reduced. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to graphite because it is crystalline material. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness because it is amorphous and therefore utilized as the surface protective layer for magnetic recording media. The deposition of DLC by CVD (chemical vapor deposition) produces DLC through excitation and decomposition of raw gas in plasma and chemical reactions, and therefore, DLC richer in $sp^3$-bonded carbon can be formed by adjusting the conditions.

Figure 6:
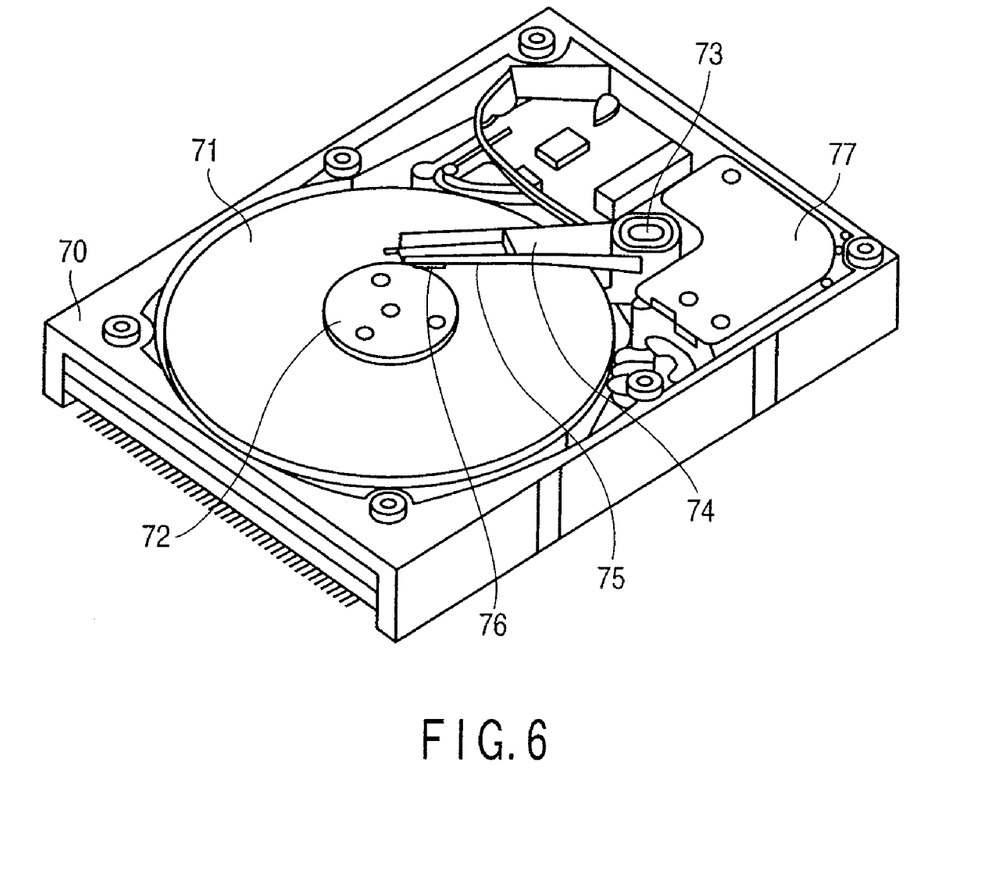
FIG. 6 is a perspective view of a magnetic recording apparatus according to an embodiment of the present invention.

FIG. 6 shows a perspective view of a magnetic recording apparatus (hard disk drive) according to an embodiment of the present invention. The magnetic recording apparatus is provided, in a chassis 70, with the above magnetic recording medium 71, a spindle motor 72 that rotates the magnetic recording medium 71, a head slider 76 with a magnetic head incorporated therein, a head suspension assembly including a suspension 75 and an actuator arm 74 for supporting the head slider 76, and a voice coil motor (VCM) 77 as an actuator of the head suspension assembly.

The magnetic recording medium 71 is rotated by the spindle motor 72. A magnetic head containing a write head and a read head is incorporated into the head slider 76. The actuator arm 74 is rotatably attached to a pivot 73. The suspension 75 is attached to one end of the actuator arm 74. The head slider 76 is elastically supported via a gimbal incorporated into the suspension 75. The voice coil motor (VCM) 77 is disposed on the other end of the actuator arm 74. The voice coil motor (VCM) 77 generates a torque to the actuator arm 74 around the pivot 73 to control the position of the magnetic head such that the magnetic head is floated above an arbitrary radial position of the magnetic recording medium 71.

EXAMPLES

Example 1

A DTR medium was manufactured by the method shown in FIGS. 3A to 3J using a stamper having servo patterns (a preamble, address, and burst) and patterns of protrusions and recesses corresponding to discrete tracks as shown in FIG. 1.

A 40-nm thick CoZrNb soft magnetic underlayer, 20-nm thick Ru orientation control underlayer, 15-nm thick CoCrPt-$SiO_2$ magnetic recording layer, 3-nm thick Ru oxidation inhibiting layer and 15-nm thick carbon hard mask layer were sequentially deposited on a substrate. A 100-nm thick SOG was spin coated thereon as a resist.

A stamper having patterns of protrusions and recesses corresponding to FIG. 1 was faced to the resist (SOG), and the patterns of protrusions and recesses of the stamper were transferred to the resist by imprinting.

The resist residues remaining on the bottoms of recesses of the resist (SOG) were removed by which a part of the surface of the hard mask layer was exposed. The conditions in the process were as follows: an inductively coupled plasma (ICP) etching apparatus was used, $CF_4$ was used as the process gas, the gas pressure was set to 0.1 Pa, the coil RF power and the platen RF power were set to 200 W and 20 W, respectively, and the etching time was set to 30 seconds.

The resist (SOG) patterns were used as masks to etch the exposed hard mask layer by which the oxidation inhibiting layer was exposed. The conditions in the process were as follows: an RIE apparatus was used, $O_2$ was used as the process gas, the gas pressure was set to 0.1 Pa, the coil RF power and the platen RF power were set to 100 W and 50 W, respectively, and the etching time was set to 30 seconds.

The resist (SOG) patterns and the patterns of the hard mask layer were used as masks to etch the oxidation inhibiting layer and the magnetic recording layer to a total thickness of 10 nm by which a part of the magnetic recording layer was remained in the recesses. The conditions in the process were as follows: an ECR ion gun was used, Ar was used as the process gas, the microwave power was set to 500 W, the acceleration voltage was set to 600 V and the etching time was set to 20 seconds.

The remaining resist (SOG) was stripped off. The conditions in the process were as follows: an ICP etching apparatus was used, $CF_4$ was used as the process gas, the gas pressure was set to 1.5 Pa, the coil RF power and the platen RF power were set to 200 W and 0 W, respectively, and the etching time was set to 120 seconds.

The magnetic recording layer remaining in the recesses was magnetically deactivated by which an amorphous nonmagnetic layer was formed. The conditions in the process were as follows: an ECR ion gun was used, He was used as the process gas, the gas pressure was set to 0.01 Pa, the microwave power was set to 1000 W, the acceleration voltage was set to 400 V, and the exposure time was set to 200 seconds.

The remaining patterns of the hard mask layer were stripped off by which the oxidation inhibiting layer on the protrusions was exposed. The conditions in the process were as follows: an ICP etching apparatus was used, $O_2$ was used as the process gas, the gas pressure was set to 1.5 Pa, the coil RF power and the platen RF power were set to 400 W and 0 W, respectively, and the etching time was set to 30 seconds.

The remaining patterns of the oxidation inhibiting layer (Ru) were stripped off by which the protruded magnetic recording layer was exposed. The conditions in the process were as follows: an ECR ion gun was used, Ar was used as the process gas, the microwave power was set to 500 W, the acceleration voltage was set to 600 V, and the etching time was set to 10 seconds.

A 5-nm carbon protective film was formed on the entire surface by CVD. A lubricant was applied to the carbon protective film by which the DTR medium was manufactured.

This medium was installed in a hard disk drive to evaluate the error rate. The manufactured medium had a track density of 244 kTPI and a bit density of 1,260 kBPI. A head used in this evaluation had a read width of 80 nm and a write width of 116 nm. The medium had an error rate of $10^{-6}$. It was confirmed from the result that the DTR medium manufactured by the method according to the invention had a satisfactory error rate.

Comparative Example 1

A DTR medium was manufactured following the similar procedures to those in Example 1 except that a carbon hard mask is directly deposited on the magnetic recording layer without providing an oxidation inhibiting layer on the magnetic recording layer.

This medium was installed in a hard disk drive to evaluate the error rate. The manufactured medium had a track density of 244 kTPI and a bit density of 1,260 kBPI. A head used in this evaluation had a read width of 80 nm and a write width of 116 nm. The medium had an error rate of $10^{-3.6}$, showing unsatisfactory error rate. The medium was observed with a sectional TEM. As a result, it was found that an oxide layer was formed on the surface of the tracks which deteriorated the error rate.

The comparison between Example 1 and Comparative Example 1 reveals that use of a manufacturing process in which the oxidation inhibiting layer is provided gives an medium with a satisfactory error rate.

Example 2

A DTR medium was manufactured following the same procedures as in Example 1, where Ru, Sn, Pb, Re, Cu, Rh, Ag, Pd, Pt, Au, $Al_2O_3$, $TiO_x$ or $TaO_x$ was used as the material for the oxidation inhibiting layer. The thickness of any oxidation inhibiting layer was set to 5 nm.

A glide test in accordance with an acoustic emission (AE) method was carried out for each medium.

Any medium in which Ru, Sn, Pb, Re, Cu, Rh, Ag, Pd, Pt, or Au was used as the oxidation inhibiting layer passed the flying test at the glide height of 10 nm.

On the other hand, any medium in which $Al_2O_3$, $TiO_x$ or $TaO_x$ was used as the oxidation inhibiting layer caused unusual vibration in the flying test at the glide height of 10 nm. The surface of these media was observed with AFM. The depth of the recesses before the oxidation inhibiting layer was stripped off was 10 nm for any medium. However, it was found that the depths of the recesses after the oxidation inhibiting layer was stripped off were 19 nm, 18 nm and 22 nm for respective media. In other words, the magnetic recording layer was overetched prior to the stripping of the oxidation inhibiting layer. This is because the oxidation inhibiting layer made of $Al_2O_3$, $TiO_x$ or $TaO_x$ has a low etching rate. As a result, the media having deep recesses cannot have satisfactory head flying characteristics.

These results teach that use of a material having a suitable etching rate for the oxidation inhibiting layer can provide satisfactory head flying characteristics as well as reduced magnetic spacing.

Example 3

DTR media were manufactured following the same procedures as in Example 1 with various thicknesses of the oxidation inhibiting layer of 1, 2, 5, 10, 15, and 20 nm.

A glide test in accordance with an acoustic emission (AE) method was carried out for each medium. Also, each medium was installed in a hard disk drive to evaluate the error rate. The manufactured medium had a track density of 244 kTPI and a bit density of 1,260 kBPI. A head used in this evaluation had a read width of 80 nm and a write width of 116 nm. These results are shown in Table 1.

Any medium having an oxidation inhibiting layer (Ru) with a thickness of 2, 5, 10, or 15 nm passed the flying test at the glide height of 10 nm. These media had an error rate between $10^{-5.2}$ and $10^{-6.0}$, showing satisfactory performance.

The medium having an oxidation inhibiting layer (Ru) with a thickness of 1 nm also passed the flying test at the glide height of 10 nm. However, the medium had an error rate of $10^{-3.6}$, showing unsatisfactory performance. This is because the oxidation inhibiting layer was so thin that the oxidation inhibiting layer was subjected to oxidation damage in stripping of the carbon hard mask.

The medium having an oxidation inhibiting layer (Ru) with a thickness of 20 nm caused unusual vibration in the flying test at the glide height of 10 nm. When the medium was observed with AFM, there were burrs on the protrusions. It is believed that, in the process of etching the magnetic recording layer to form protrusions and recesses, an oxidation inhibiting layer with an excessive thickness produces re-deposited products on the sidewalls of the protrusions.

These results demonstrate that an appropriate thickness of the oxidation inhibiting layer is 2 to 15 nm.

TABLE 1

Thickness of oxidation inhibiting layer and error rate

| Thickness of oxidation inhibiting layer (Ru) [nm] | Glide test | Error rate $[10^{-x}]$ |
|---|---|---|
| 1 | passed | 3.6 |
| 2 | passed | 5.2 |
| 5 | passed | 6.0 |
| 10 | passed | 5.8 |
| 15 | passed | 5.8 |
| 20 | NG | — |

Comparative Example 2

A DTR medium was manufactured following the similar procedures to those in Example 1 except that the oxidation inhibiting layer was stripped using $CF_4$ gas, not using milling by Ar gas.

This medium was installed in a hard disk drive to evaluate the error rate. The medium exhibited unsatisfactory performance. It is believed that the magnetic recording layer was subjected to damage due to fluorine in stripping the oxidation inhibiting layer.

Comparative Example 3

A DTR medium was manufactured following the similar procedures as in Example 1 except that the carbon hard mask layer was stripped using $CF_4$ gas, not using $O_2$ gas.

When a glide test was performed, the medium caused unusual vibration. The medium was observed with a sectional TEM. As a result, it was found that the carbon hard mask layer was not sufficiently stripped off by using $CF_4$ gas, and thus many defective projections were generated.

Example 4

DTR media were manufactured with similar procedures to those in Example 1 except that the magnetic recording layer was deactivated using $O_2$, $N_2$, He, Ne, $CF_4$, $SF_6$, $CHF_3$, or the magnetic recording layer was not deactivated.

These media were installed in a hard disk drive, respectively, to evaluate fringe characteristics. The manufactured medium had a track density of 244 kTPI and a bit density of 1,260 kBPI. A head used in this evaluation had a read width of 80 nm and a write width of 116 nm.

For the media in which the magnetic recording layer was deactivated using $O_2$, $N_2$, He, Ne, $CF_4$, $SF_6$, or $CHF_3$, the error rate before adjacent recording was $10^{-6}$, and that after recording was performed on adjacent tracks 1,000 times was $10^{-4.8}$ to $10^{-5.6}$, showing satisfactory performance. These results indicate that the DTR medium manufactured by the method comprising deactivation of the magnetic recording layer exhibits adjacent recording tolerance.

On the other hand, the medium in which the magnetic recording layer was not deactivated, the error rate before adjacent recording was $10^{-6}$, and that after recording was performed on adjacent tracks 1,000 times was $10^{-3.6}$, showing unsatisfactory performance. This is because magnetism of the magnetic recording layer remaining in the recesses is not deactivated sufficiently, so that adjacent recording tolerance is deteriorated.

TABLE 2

Deactivating gas and adjacent recording tolerance

| Deactivating gas | Error rate [$10^{-x}$] |
|---|---|
| $O_2$ | 4.9 |
| $N_2$ | 5.0 |
| He | 5.2 |
| Ne | 4.8 |
| $CF_4$ | 5.6 |
| $SF_6$ | 5.0 |
| $CHF_3$ | 5.0 |
| none | 3.6 |

Example 5

A bit patterned medium was manufactured by the method shown in FIGS. 4A to 4I using a stamper having servo patterns (a preamble, address, and burst) and patterns of protrusions and recesses corresponding to bit patterns as shown in FIG. 2.

A 40-nm thick CoZrNb soft magnetic underlayer, 20-nm thick Ru orientation control underlayer, 15-nm thick $Co_{80}Pt_{20}$ magnetic recording layer, 3-nm thick Ru oxidation inhibiting layer and 10-nm thick carbon hard mask layer were sequentially deposited on a substrate. A 100-nm thick SOG was spin coated thereon as a resist.

A stamper having patterns of protrusions and recesses corresponding to FIG. 2 was faced to the resist (SOG), and the patterns of protrusions and recesses of the stamper were transferred to the resist by imprinting.

The resist residues remaining on the bottoms of recesses of the resist (SOG) were removed by which a part of the surface of the hard mask layer was exposed. The conditions in the process were as follows: an inductively coupled plasma (ICP) etching apparatus was used, $CF_4$ was used as the process gas, the gas pressure was set to 0.1 Pa, the coil RF power and the platen RF power were set to 200 W and 20 W, respectively, and the etching time was set to 30 seconds.

The resist (SOG) patterns were used as masks to etch the exposed hard mask layer by which the oxidation inhibiting layer was exposed. The conditions in the process were as follows: an RIE apparatus was used, $O_2$ was used as the process gas, the gas pressure was set to 0.1 Pa, the coil RF power and the platen RF power were set to 100 W and 50 W, respectively, and the etching time was set to 30 seconds.

The resist (SOG) patterns and the patterns of the hard mask layer were used as masks to etch the oxidation inhibiting layer and the magnetic recording layer to a total thickness of 10 nm by which a part of the magnetic recording layer was remained in the recesses. The conditions in the process were as follows: an ECR ion gun was used, Ar was used as the process gas, the microwave power was set to 500 W, the acceleration voltage was set to 600 V and the etching time was set to 20 seconds.

The remaining resist (SOG) was stripped off. The conditions in the process were as follows: an ICP etching apparatus was used, $CF_4$ was used as the process gas, the gas pressure was set to 1.5 Pa, the coil RF power and the platen RF power were set to 200 W and 0 W, respectively, and the etching time was set to 120 seconds.

The remaining patterns of the hard mask layer were stripped off by which the oxidation inhibiting layer on the protrusions was exposed. The conditions in the process were as follows: an ICP etching apparatus was used, $O_2$ was used as the process gas, the gas pressure was set to 1.5 Pa, the coil RF power and the platen RF power were set to 400 W and 0 W, respectively, and the etching time was set to 30 seconds.

The remaining patterns of the oxidation inhibiting layer (Ru) were stripped off by which the protruded magnetic recording layer was exposed and, at the same time, the magnetic recording layer in the recesses was etched. The conditions in the process were as follows: an ECR ion gun was used, Ar was used as the process gas, the microwave power was set to 500 W, the acceleration voltage was set to 600 V, and the etching time was set to 10 seconds.

A 5-nm carbon protective film was formed on the entire surface by CVD. A lubricant was applied to the carbon protective film by which the bit patterned medium was manufactured.

This medium was installed in a hard disk drive to operate. There was no trouble in servo tracking and read/write test, and the medium had an error rate of $10^{-5}$. It was confirmed that the medium manufactured by the method of the present invention exhibited sufficient performance as the bit patterned medium.

Example 6

A DTR medium was manufactured by the method shown in FIGS. 5A to 5L using a stamper having servo patterns (a preamble, address, and burst) and patterns of protrusions and recesses corresponding to discrete tracks as shown in FIG. 1.

A 40-nm thick CoZrNb soft magnetic underlayer, 20-nm thick Ru orientation control underlayer, 15-nm thick CoCrPt-SiO$_2$ magnetic recording layer, 3-nm thick Ru oxidation inhibiting layer and 15-nm thick carbon hard mask layer were sequentially deposited on a substrate. A 100-nm thick SOG was spin coated thereon as a resist.

A stamper having patterns of protrusions and recesses corresponding to FIG. 1 was faced to the resist (SOG), and the patterns of protrusions and recesses of the stamper were transferred to the resist by imprinting.

The resist residues remaining on the bottoms of recesses of the resist (SOG) were removed by which a part of the surface of the hard mask layer was exposed. The conditions in the process were as follows: an inductively coupled plasma (ICP) etching apparatus was used, CF$_4$ was used as the process gas, the gas pressure was set to 0.1 Pa, the coil RF power and the platen RF power were set to 200 W and 20 W, respectively, and the etching time was set to 30 seconds.

The resist (SOG) patterns were used as masks to etch the exposed hard mask layer by which the oxidation inhibiting layer was exposed. The conditions in the process were as follows: an RIE apparatus was used, O$_2$ was used as the process gas, the gas pressure was set to 0.1 Pa, the coil RF power and the platen RF power were set to 100 W and 50 W, respectively, and the etching time was set to 30 seconds.

The resist (SOG) patterns and the patterns of the hard mask layer were used as masks to etch the oxidation inhibiting layer and the magnetic recording layer to a total thickness of 10 nm by which a part of the magnetic recording layer was remained in the recesses. The conditions in the process were as follows: an ECR ion gun was used, Ar was used as the process gas, the microwave power was set to 500 W, the acceleration voltage was set to 600 V and the etching time was set to 20 seconds.

The remaining resist (SOG) was stripped off. The conditions in the process were as follows: an ICP etching apparatus was used, CF$_4$ was used as the process gas, the gas pressure was set to 1.5 Pa, the coil RF power and the platen RF power were set to 200 W and 0 W, respectively, and the etching time was set to 120 seconds.

The magnetic recording layer remaining in the recesses was magnetically deactivated by which an amorphous nonmagnetic layer was formed. The conditions in the process were as follows: an ECR ion gun was used, He was used as the process gas, the gas pressure was set to 0.01 Pa, the microwave power was set to 1000 W, the acceleration voltage was set to 400 V, and the exposure time was set to 200 seconds.

The remaining patterns of the hard mask layer were stripped off by which the oxidation inhibiting layer on the protrusions was exposed. The conditions in the process were as follows: an ICP etching apparatus was used, O$_2$ was used as the process gas, the gas pressure was set to 1.5 Pa, the coil RF power and the platen RF power were set to 400 W and 0 W, respectively, and the etching time was set to 30 seconds.

The remaining patterns of the oxidation inhibiting layer (Ru) were stripped off by which the protruded magnetic recording layer was exposed. The conditions in the process were as follows: an ECR ion gun was used, Ar was used as the process gas, the microwave power was set to 500 W, the acceleration voltage was set to 600 V, and the etching time was set to 10 seconds.

A 100-nm thick SiO$_2$ nonmagnetic layer was deposited on the entire surface to fill the recesses. The conditions in the process were as follows: an RF sputtering apparatus was used, a bias voltage applied to the substrate was set to 100 V, and the RF power was set to 500 W. Then, the nonmagnetic layer was etched back. The steps of filling and etch-back were repeated five times for surface flattening.

A 5-nm carbon protective film was formed on the entire surface by CVD. A lubricant was applied to the carbon protective film by which the DTR medium was manufactured.

A glide test was carried out for the medium. As a result, the medium passed flying tests at a glide height of 10 nm and 8 nm, showing good head flying characteristics as an HDD medium.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of manufacturing a magnetic recording medium comprising:
    forming a magnetic recording layer, an antioxidant layer with a thickness of 2 to 15 nm, and a hard mask layer comprising carbon as a main component on a substrate;
    coating the hard mask layer with a resist;
    transferring patterns of protrusions and recesses to the resist by imprinting in order to form resist patterns;
    subsequently etching the hard mask layer using the resist patterns as masks, etching the antioxidant layer, and etching and demagnetizing the magnetic recording layer in order to form patterns of the magnetic recording layer, and subsequently stripping the resist patterns, stripping the hard mask layer by etching with Oxygen (O$_2$) gas, and stripping a portion or all of the antioxidant layer by Argon (Ar) ion milling,
    wherein the antioxidant layer has an etching rate by the Argon (Ar) ion milling that is higher than an etching rate of the magnetic recording by the Argon ion milling.

2. The method of claim 1, wherein the antioxidant layer is selected from the group consisting of Tin(Sn), Lead(Pb), Rhenium(Re), Copper(Cu), Ruthenium(Ru), Rhodium(Rh), Silver(Ag), Palladium(Pd), Platinum(Pt) and Gold(Au), and alloys, oxides and nitrides thereof.

3. The method of claim 1, wherein the hard mask layer has a thickness of 3 to 40 nm.

4. The method of claim 1, wherein demagnetizing the magnetic recording layer is performed by using a gas selected from the group consisting of Oxygen(O$_2$), Nitrogen(N$_2$), Helium(He), Neon(Ne), Tetrafluoromethane(CF$_4$), Sulfur hexafluoride(SF$_6$), Fluoroform(CHF$_3$), and a mixed gas thereof.

5. The method of claim 1, wherein the antioxidant layer and the magnetic recording layer have a total thickness of about 10 nm.

6. The method of claim 1, wherein the magnetic recording medium has a protective layer with a thickness of between about 1 nm and about 10 nm.

7. The method of claim 1, wherein etching the magnetic recording layer comprises forming protrusions and recesses in the magnetic recording layer, and wherein the magnetic recording layer is further etched to remove the magnetic recording layer in the recesses, and wherein the further etching of the magnetic recording layer and the stripping of the antioxidant layer are performed simultaneously.

8. The method of claim 1, wherein the hard mask has a carbon content of at least 75% by molar ratio.

9. The method of claim 1, wherein etching of the magnetic recording layer is performed using an ion beam using a gas selected from the group consisting of Helium (He), Neon (Ne), Argon (Ar), Krypton (Kr), Xenon (Xe), Oxygen ($O_2$), and Nitrogen ($N_2$).

10. The method of claim 1, wherein the hard mask is about 15 nm thick.

11. The method of claim 1, wherein the antioxidant layer has a thickness of about 10 nm.

12. The method of claim 1, wherein reaction products formed by demagnetizing the magnetic recording layer are removed by washing with a washing agent selected from the group consisting of water, water vapor plasma, and $H_2$ plasma.

13. The method of claim 1, wherein the magnetic recording layer has a perpendicular magnetic recording layer that has Cobalt (Co) as a main component.

14. The method of claim 1, wherein the substrate is selected from the group consisting of glass, Aluminum-based alloy, ceramic, Carbon (C), and Silicon (Si) single crystal having an oxide surface.

15. The method of claim 1, wherein the magnetic recording layer has a perpendicular magnetic recording layer that is between about 10 nm to about 40 nm thick.

16. The method of claim 1, wherein the demagnetizing of the magnetic recording layer is performed using a gas selected from the group consisting of Helium (He), Neon (Ne), Argon (Ar), Krypton (Kr), and Xenon (Xe).

17. The method of claim 1, wherein forming a magnetic recording layer comprises depositing a CoZrNb soft magnetic underlayer, a Ru orientation control underlayer, and a CoCrPt—SiO2 layer.

18. The method of claim 1, wherein the thickness of the antioxidant layer after stripping is at most about 4 nm.

19. The method of claim 1, wherein the magnetic recording layer has a perpendicular magnetic recording layer containing Cobalt (Co) and Platinum (Pt).

* * * * *